3,043,833
17-CYANOHYDRIN OF 19-NOR ANDROSTENE-DIONE AND 3-DERIVATIVES THEREOF
Pietro de Ruggieri, Milan, Italy, assignor to Ormonoterapia Richter S.p.A., Milan, Italy, a corporation of Italy
No Drawing. Filed July 14, 1961, Ser. No. 124,003
3 Claims. (Cl. 260—239.55)

The present invention relates to the 17-cyanohydrin of 19-nor androstenedione and its 3-derivatives, particularly the 3-enol ether and the 3-ketal of the 17-cyanohydrin of 19-nor androstenedione.

These compounds, 17-cyano, 17-ol, estra, 4-ene, 3-one; 3-ethoxy, 17-cyano, 17-ol, estra, 3:5-diene and 3-ethylenedioxy, 17-cyano, 17-ol, estra, 5-ene, normally exist as epimeric mixtures of the 17α-cyano, 17β-ol and 17β-cyano, 17α-ol compounds and they each have biological activity making them useful as agents for carrying out steroid therapy. The compounds of this invention each exhibit a high progestational and estrogenic activity while possessing a very low androgenic activity and they may be compounded with various conventional pharmaceutically acceptable carriers to provide compositions suitable for either oral or parenteral administration.

The compounds of this invention are also useful as intermediates in the preparation of other physiologically active steroids as is shown by U.S. Patents 2,849,461 and 2,849,462.

The patent of Ercoli et al. 2,742,485, which issued April 17, 1956, discloses the preparation of epimeric androstenedione, 17-cyano, 17-ol, its 3-ethyleneglycol-ketal and its 3-ethyl enol ether but in contrast with the compounds of the present invention, the methyl homologs of the androstane series demonstrate substantial androgenic activity but are devoid of any progestational or estrogenic activity.

Epimeric 17-cyano, 17-ol, estra, 4-ene may be prepared by reacting estra 4-ene, 3-17-dione (19-nor androstenedione) with an excess of acetone cyanohydrin as such or in alcoholic solution to obtain in nearly theoretical yield a mixture of the two epimeric cyanohydrins, 17α-cyano, 17β-ol, estra, 4-ene, 3-one and 17β-cyano, 17α-ol estra, 4-ene, 3-one. This mixture melts at 150–152° (dec.). It must be pointed out, however, that the melting points of the crude cyanohydrins, generally consisting of easily interconvertible epimeric mixtures, may often show remarkable changes. The speed of heating during the melting point determination can also affect results.

In this reaction the 3-keto group, which is conjugated to the 4:5-double bond is unaffected, while the reaction follows a very different course if, instead of acetone-cyanohydrin, anhydrous hydrogen cyanide or alkaline cyanides in an acid medium are employed.

The epimeric mixture of cyanohydrins is used as such in the following enolization or acetalization step. Thus, for example, by reacting with ethyl orthoformate in the presence of alcoholic hydrogen chloride, the 3-enol ethyl ether of 19-nor androstenedione, 17-cyanohydrin, which may be identified as epimeric 3-ethoxy, estra, 3:5-diene, 17-cyano, 17-ol is obtained melting at 177–179° (dec.).

If a dihydric alcohol is employed in the place of a monofunctional one, a cyclic ketal will be obtained instead of an enol ether. Thus, by reacting the 17-cyanohydrin of 19-nor androstenedione with ethyleneglycol, there is obtained the 3-ethyleneglycol ketal, which may be identified as epimeric 3-ethylenedioxy, estra, 5-ene, 17-cyano, 17-ol, melting at 199°–200° (dec.).

The preparation of the compounds of this invention is described by the following examples:

*Example I*

13.6 parts by weight of estra, 4-ene, 3:17-dione (19-nor androstenedione) are dissolved by stirring and gentle heating in 20 parts of acetone cyanohydrin, freshly prepared according to the procedure of Wagner and Baizer (Organic Syntheses, 20–43, note 1, 1940). Crystallization of the cyanohydrin begins after several minutes and after two hours at room temperature, the mixture is diluted with a large volume of water, and the precipitate is filtered, washed with water and dried in vacuum at room temperature. There are thus obtained 14.7 parts (93.3% yield) of 17-cyano, 17-ol, estra, 4-ene, 3-one (epimeric mixture). M.P. 150°–152° (dec.). Found N:4.66%. Calc. for $C_{19}H_{25}O_2N$:4.67%.

*Example II*

6.9 parts of estra, 4-ene, 3:17-dione are dissolved by stirring and gentle heating in 10 parts of freshly distilled acetone cyanohydrin to which 0.1 part of an aqueous solution of potassium cyanide (2.17 grams KCN in 5 mls. of water) have been added. After two hours at room temperature, the mixture, from which the cyanohydrin has already partly crystallized, is diluted with a large volume of water and the precipitate is filtered, carefully washed with water and dried in vacuum. There are thus obtained 7.2 parts of 17-cyano, 17-ol, estra, 4-ene, 3-one melting at 150°–152° (dec.).

*Example III*

The same procedure is followed as in Example II except that 0.1 part of an aqueous solution of $K_2CO_3$(2.3 grams $K_2CO_3$ in 5 ml. of water) are used instead of KCN.

*Example IV*

To a solution of 3.5 parts of estra, 4-ene, 3:17-dione in 15 parts ethanol are added 5 parts of freshly prepared crude acetone cyanohydrin. After two hours at room temperature, the solution is diluted with a large volume of water and the precipitate is filtered, washed with water and dried in vacuum. There are obtained 3.6 parts of 17-cyano, 17-ol, estra, 4-ene, 3-one melting at 151°–153° (dec.).

*Example V*

To a solution of 3.5 parts of estra, 4-ene, 3:17-dione in 20 parts of ethyl ether are added 5 parts of freshly prepared crude acetone cyanohydrin. After a few minutes crystallization beings and, after two hours at room temperature, the product is filtered, washed with a little hexane and dried in vacuum. 2 parts of 17-cyano, 17-ol, estra, 4-ene, 3-one melting at 150°–153° (dec.) are obtained. Further dilution of the mother liquors with hexane yields an additional 0.3 part of a crystalline product melting at 148°–150° (dec.).

*Example VI*

To a solution of 6 parts of 17-cyano, 17-ol, estra, 4-ene, 3-one, obtained as described in the foregoing examples, in 150 parts of anhydrous benzene are added 7 parts of ethyl orthoformate, 3.5 parts of absolute ethyl alcohol and 0.3 part of a 6.3% ethyl alcohol solution of hydrogen chloride. After heating for one hour at 65° C. in a moisture-free flask, 0.19 part of pyridine are added to neutralize the acid present and the solution is evaporated to dryness. There is thus obtained 6.56 parts of crude 3-ethoxy, 17-cyano, 17-ol, estra, 3:5-diene melting at 170°–175° (dec.) that can be further purified by crystallization from ethyl ether to yield crystals melting at 177°–179° (dec.).
Found: C 77.1%; H 8.93%; N 4.25%. Calc. for $C_{21}H_{29}O_2N$: C 77.02%; H 8.93%; N 4.28%.

*Example VII*

The same procedure is followed as in Example VI, except that 0.2 part of para toluenesulfonic acid are used instead of alcoholic hydrogen chloride.

*Example VIII*

To a solution of 10 parts of 17-cyano, 17-ol, estra, 4-ene, 3-one, obtained as described in Examples I to V, in 200 parts of anhydrous benzene are added 10 parts of ethylene glycol and 0.5 part of para toluenesulfonic acid and the resulting mixture is refluxed for 16–20 hours in an apparatus provided with a trap for removing water formed in the reaction. 0.23 part of pyridine are then added to neutralize acidity and the solution is evaporated under reduced pressure nearly to dryness. The residue is diluted with water and the crystalline precipitate is filtered, washed with water and dried in vacuum. There are obtained 11.6 parts of 3-ethylenedioxy, 17-cyano, 17-ol, estra, 5-ene melting at 190°–200° (dec.).

Found: C 73.39%; H 8.55%; N 4.05%. Calc. for $C_{21}H_{29}O_3N$: C 73.44%; H 8.51%; N 4.04%.

*Example IX*

To a solution of 10 parts of 17-cyano, 17-ol, estra, 4-ene, 3-one, obtained as described in Examples I to V, in 500 parts of anhydrous chloroform are added 10 parts of ethylene glycol and 0.5 part of para toluenesulfonic acid. The mixture is refluxed for 5 hours in an apparatus provided with a trap for removing water formed in the reaction. The trap is assembled in such a way that moist chloroform from the condenser is run through phosphorous pentoxide mixed with filtering earth before re-entering the flask. 0.23 part of pyridine are added after 5 hours to neutralize acidity and the solution is evaporated under reduced pressure nearly to dryness. The crystalline residue is diluted with water, collected on a filter, washed with water and dried in vacuum. There is thus obtained 11.8 parts of 3-ethylenedioxy, 17-ol, 17-cyano, estra, 5-ene melting at 197°–199° (dec.). A mixed melting point determination with the product described in Example VIII shows no depression.

The present application is a continuation-in-part of my copending applicataion Serial No. 653,078 filed April 16, 1957, now abandoned.

I claim:
1. 17-cyano, 17-ol, estra, 4-ene, 3-one.
2. 3-ethoxy, 17-cyano, 17-ol, estra, 3:5-diene.
3. 3-ethylenedioxy, 17-cyano, 17-ol, estra, 5-ene.

References Cited in the file of this patent

UNITED STATES PATENTS

| | | |
|---|---|---|
| 2,743,066 | Ercoli et al. | Feb. 7, 1956 |
| 2,849,461 | Ruggieri | Aug. 26, 1958 |